UNITED STATES PATENT OFFICE.

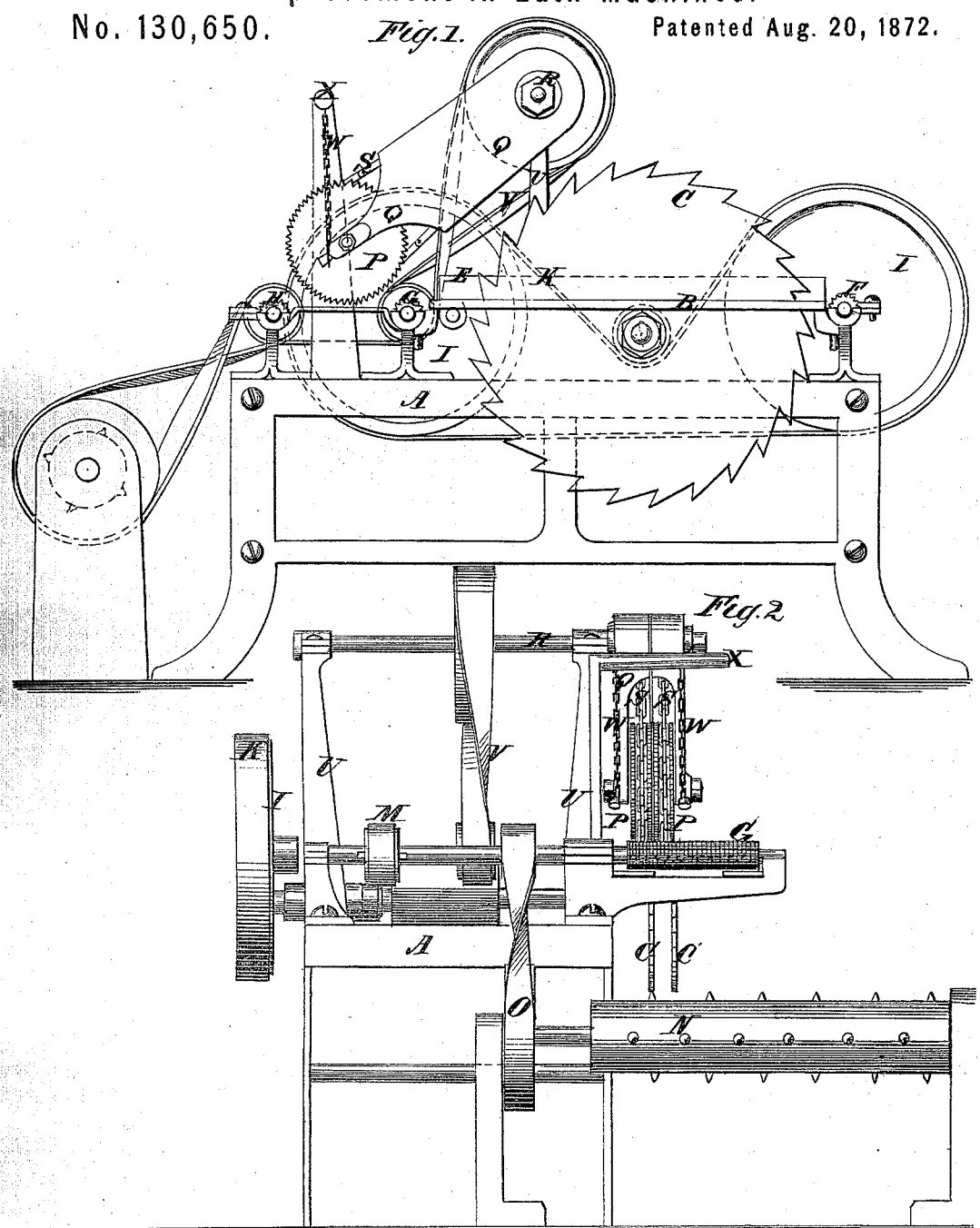

OLIVER C. MEIGS, OF DUBUQUE, IOWA.

IMPROVEMENT IN LATH-MACHINES.

Specification forming part of Letters Patent No. 130,650, dated August 20, 1872.

Specification describing a new and Improved Lath-Bolting Machine, invented by OLIVER C. MEIGS, of Dubuque, in the county of Dubuque and State of Iowa.

My invention consists of a combination of a pair of toothed drawing or feeding disks or rollers, with a pair of bolting-saws and the ordinary feed-rollers, which said toothed rollers are suspended by an oblique frame from an axis over the saws, so as to work on the upper sides of the cut bolts and rise and fall with the irregularities of the surfaces of the slabs, said rollers being driven by machine-chains worked by drums on the axis, from which the roller-supporting frame is suspended, and said chains are inclosed in cases to prevent them from being clogged with saw-dust. The said swinging-frame or support for the rollers has chains or links connecting its lower end with a support above, to prevent the rollers from falling too low when the bolts pass from under them.

Figure 1:
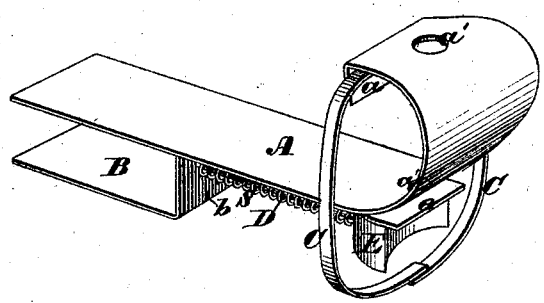
Figure 2:
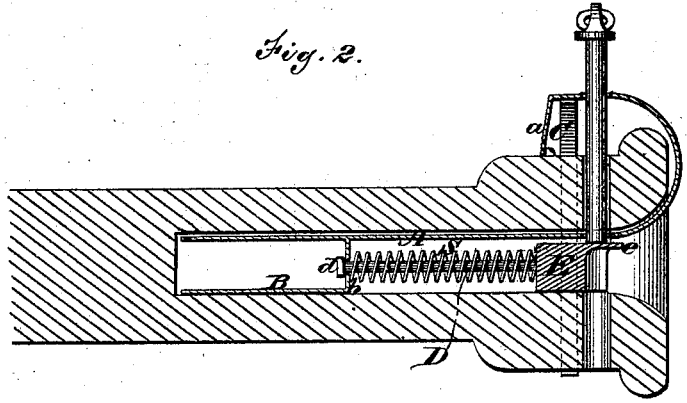

Figure 1 is a side elevation of my improved machine. Fig. 2 is a rear elevation; Fig. 3 is a plan view; and Fig. 4 is a detail, showing the arrangement of the supporting and operating gear for the toothed rollers.

Similar letters of reference indicate corresponding parts.

A represents a rectangular cast-metal frame, with a saw-table, B, upon one side, wherein two circular bolting-saws, C, mounted on one mandrel, D, work, said saws being placed as far apart as the width of a lath-bolt, and a guide, E, being placed the same distance from the innermost saw for cutting two bolts at the same time. F is a spiked feed-roller at the front of the saws; G, another at the rear, and H, a third, behind G, all being to work under the slab, against its smooth and plane side. The shafts of these rollers extend across to the opposite side of the frame, and F and G have each a large pulley, I, driven by a belt, K, passing under the small flanged pulley L on the end of the mandrel, and deriving motion therefrom. The rearmost feed-roller shaft H is driven by a belt, M, from the shaft of roller G, and the said shaft of roller H drives the large spiked feed-drum N, behind and below the feed-rollers, by a crossed belt, O; said drum is designed to receive the remainder of unsawed slabs, if any, as they fall from the saw-table, and shoot them back up an inclined plane or table in front of the machine, (not shown to the operator.) P represents a pair of toothed disks or wheels for working on the upper side of the bolts to draw them along after they are fed from the front feeding-rollers, which said rollers are provided with a deep groove in the face, and journaled in the lower end of a slanting frame, Q, one for each, pivoted at the upper end to the shaft R, on which shaft is a chain driving-wheel, R, for each roller, which drives the roller by a machine-chain, S, from the same axis whereon the frame swings, so that no matter how much the rollers swing around said axis the relative arrangement of the chains and wheels will not be disturbed. The shaft R is mounted in bearings in the upper ends of supports U rising up from the main frame, and it is driven by the crossed belt V from a small pulley on the shaft of roller G. The lower ends of frame Q are connected by chains W with a support, X, arranged to prevent the rollers from falling below the saw-table when there are no bolts under them. The saw-table being cast together with the frame, I have a wide slot in it to allow of putting the saws on the mandrel and taking them off without removing the mandrel, and I fill this slot by the movable plates Z and $Z^1$, which are fastened by hinges $Y'$ at one end, and by the screws $Z^2$ at the other. These plates swing up out of the way when the screws are taken out, and leave a free space for applying or removing the same.

Having thus described my invention, I claim as new and desire to secure by Letters Patent—

1. The combination of spiked feed-rollers F G, H, two toothed upper rollers, P, and two bolting-saws, C, substantially as specified.

2. The said swinging-roller supporting-frames, connected by chains W to an upper support, X, substantially as specified.

OLIVER C. MEIGS.

Witnesses:
MARTIN H. MOORE,
MILTON A. MOORE.

G. H. MERRIAM.

Improvement in Car-Couplings.

No. 130,651.                Patented Aug. 20, 1872.

Witnesses.

Inventor
George H. Merriam
By his Attys
Hill & Ellsworth